United States Patent

Frieh et al.

(10) Patent No.: US 9,094,229 B2
(45) Date of Patent: Jul. 28, 2015

(54) LOAD BALANCING IN A DOCSIS SYSTEM BASED ON WEIGHTING UPSTREAM AND DOWNSTREAM CHANNEL LOADING CONDITIONS

(75) Inventors: Dwain Edward Frieh, Oswego, IL (US); Steven Paul Nolle, Naperville, IL (US); Craig Patrick Coogan, Lisle, IL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 455 days.

(21) Appl. No.: 13/006,544

(22) Filed: Jan. 14, 2011

(65) Prior Publication Data

US 2012/0182871 A1   Jul. 19, 2012

(51) Int. Cl.
*H04L 12/26* (2006.01)
*H04L 12/28* (2006.01)
*H04L 12/803* (2013.01)

(52) U.S. Cl.
CPC .......... *H04L 12/2885* (2013.01); *H04L 47/125* (2013.01)

(58) Field of Classification Search
CPC .............. H04L 12/2801; H04L 47/125; H04L 43/0829; H04L 43/0852; H04N 7/17309
USPC ................. 370/235, 389, 468, 230, 401, 229; 725/86–104
See application file for complete search history.

(56) References Cited

U.S. PATENT DOCUMENTS

| | | |
|---|---|---|
| 2005/0025145 A1* | 2/2005 | Rakib et al. .................... 370/389 |
| 2007/0204311 A1* | 8/2007 | Hasek et al. ..................... 725/91 |
| 2010/0010860 A1* | 1/2010 | Bose et al. ......................... 705/9 |
| 2010/0172249 A1* | 7/2010 | Liu ................................ 370/252 |

* cited by examiner

*Primary Examiner* — Jamal Javaid
(74) *Attorney, Agent, or Firm* — Troy A. Van Aacken

(57) ABSTRACT

Methods and apparatuses for balancing a network load are provided. A control attribute that allows a system operator to prioritize upstream and downstream channel loading conditions relative to each other for load balancing decisions is used to balance the network load.

14 Claims, 5 Drawing Sheets

LOAD BALANCING IN A DOCSIS SYSTEM BASED ON WEIGHTING UPSTREAM AND DOWNSTREAM CHANNEL LOADING CONDITIONS

TECHNICAL FIELD

This disclosure relates to load balancing.

BACKGROUND

A Data-Over-Cable Service Interface Specification (DOCSIS) system can be used to deliver high-definition digital entertainment and telecommunications such as video, voice, and high-speed Internet to subscribers over an existing cable television network. The cable television network can take the form of an all-coax, all-fiber, or hybrid fiber/coax (HFC) network. A multiple service operator (MSO) can deliver these services to subscribers by using a cable modem termination system (CMTS) located at a headend and customer premise equipment (CPE) devices located at subscriber premises. The CPE devices can include cable modems (CMs), which can include embedded multimedia terminal adapters (eMTAs). A CMTS routes traffic (e.g., data, video, and voice signals) to and from CPE devices on downstream and upstream channels, respectively.

In an effort to balance the downstream and upstream channel loads, the CMTS can change the set of downstream and upstream channels used by the CMs. Generally, load balancing attempts to prevent any one channel from becoming overburdened when excess capacity is available on another reachable channel. Thus, the CMTS can be configured to attempt to balance traffic, for example, across a number of channels by changing the set of downstream and upstream channels one or more CMs can use.

This disclosure generally describes load balancing in a communication system, such as a DOCSIS system, for example.

DETAILED DESCRIPTION

Various implementations of this disclosure provide a control attribute that allows a system operator to prioritize the upstream and downstream channel loading conditions relative to each other for load balancing decisions. Thus, various implementations of this disclosure can provide a network administrator with the ability to bias or weight a load balancing decision in favor of either the upstream or downstream channel loading conditions.

Figure 1:
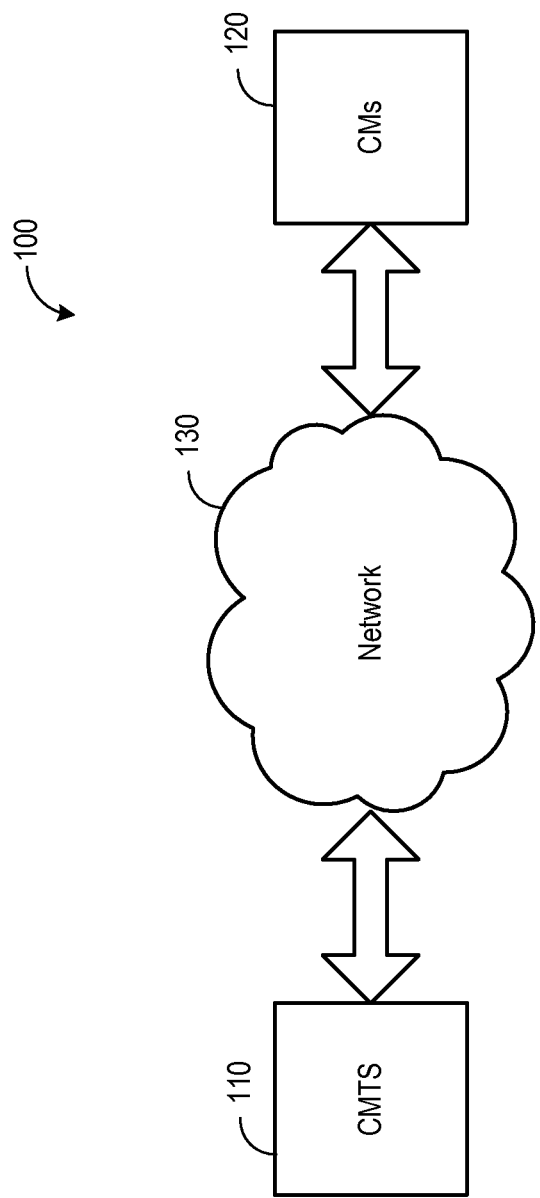
FIG. 1 illustrates a high level block diagram of a DOCSIS network for transferring traffic between a CMTS and a CM over a network.

As shown in FIG. 1, traffic (e.g., data, video, and voice signal) is transferred over a cable network 130 via one or more channels between a Cable Modem Termination System (CMTS) 110 and cable modems (CMs) 120. The CMTS 110 is located at a cable system head-end and the CMs 120 are located at subscriber premises. The cable network 130 can take the form of an all-coax, all-fiber, or hybrid fiber/coax (HFC) network.

Traffic transferred from the CMTS 110 to a CM 120 is said to travel in a downstream direction on one or more downstream channels; conversely, traffic transferred from a CM 120 to the CMTS 110 is said to travel in an upstream direction on one or more upstream channels. For example, as shown in the example DOCSIS system 200 of FIG. 2, two downstream channels D1 and D2 and four upstream channels U1, U2, U3, U4 are used for bi-directional communication between the CMTS 110 and CMs 120. The downstream channels D1 and D2 are combined by combiner 215 and received by optical transmitter 225. Optical transmitter 225 converts the electrical signals representing the combined downstream channels to optical signals and transmits the optical signals to fiber nodes 230, 235 via coupler 127. Each fiber node 230, 235 includes an optical receiver that converts the received optical signals to electrical signals that are transmitted to the CMs 120 that are served by the fiber node. Fiber nodes 230, 235 also include an upstream optical transmitter that converts the electrical signals received from the CMs 120 to optical signals and transmits the optical signals to optical receivers 240, 245, respectively. Optical receivers 240, 245 convert the upstream optical signals to electrical signals representing upstream channels U1 and U2 and U3 and U4, respectively, and transmit the electrical signals to CMTS 110 via couplers 250, 255, respectively.

Figure 2:
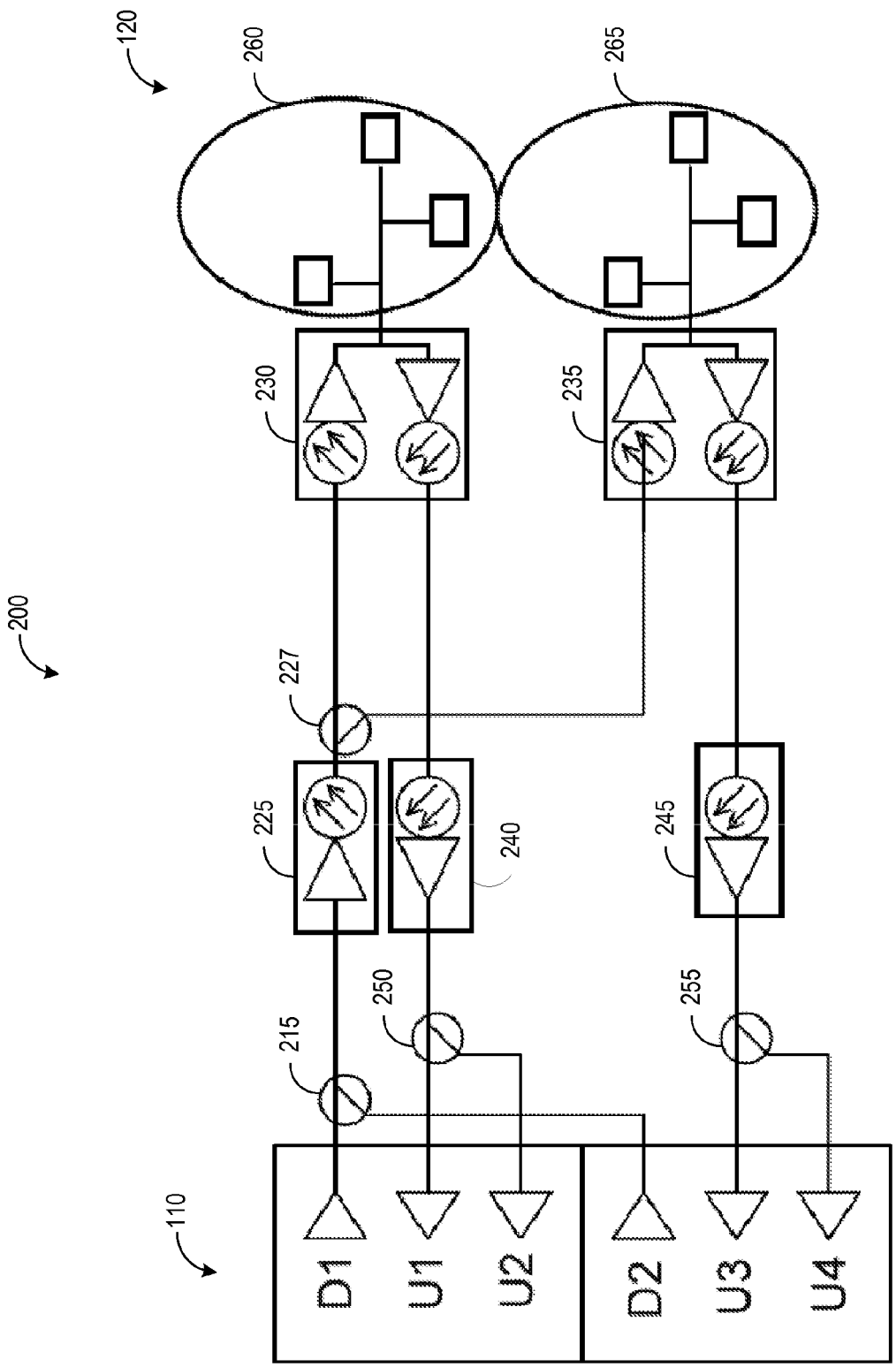
FIG. 2 illustrates an example DOCSIS-based network.

As shown in FIG. 2, there are two groups 260, 265 of cable modems. All the CMs in group 260 are connected to the coax segment of fiber node 230. Accordingly, all CMs in group 260 reach the same set of downstream and upstream channels (namely, D1, D2, U1, and U2). Thus, depending on the DOCSIS system 200 configuration, the CMs in group 260 can receive traffic on downstream channel D1 and/or D2 and transmit traffic on upstream channels U1 and/or U2. The CMTS 110 can change the set of downstream and upstream channels used by a CM. Similarly, all the CMs in group 265 are connected to the coax segment of fiber node 235. Accordingly, all CMs in group 265 reach the same set of downstream and upstream channels (namely D1, D2, U3, and U4). Thus, depending on the DOCSIS system 200 configuration, the CMs in group 265 can receive traffic on downstream channels D1 and/or D2 and transmit traffic on upstream channels U3 and/or U4.

DOCSIS identifies a cable modem service group (CM-SG) as the set of upstream and downstream CMTS channels that reach a single cable modem. For example, in the system of FIG. 2, there are two CM-SGs. CM-SG1 includes D1, D2, U1, and U2 and CM-SG2 includes D1, D2, U3, and U4. In an HFC deployment, all CMs reached by the same fiber node are reached by the same set of channels, as discussed above.

Figure 3:
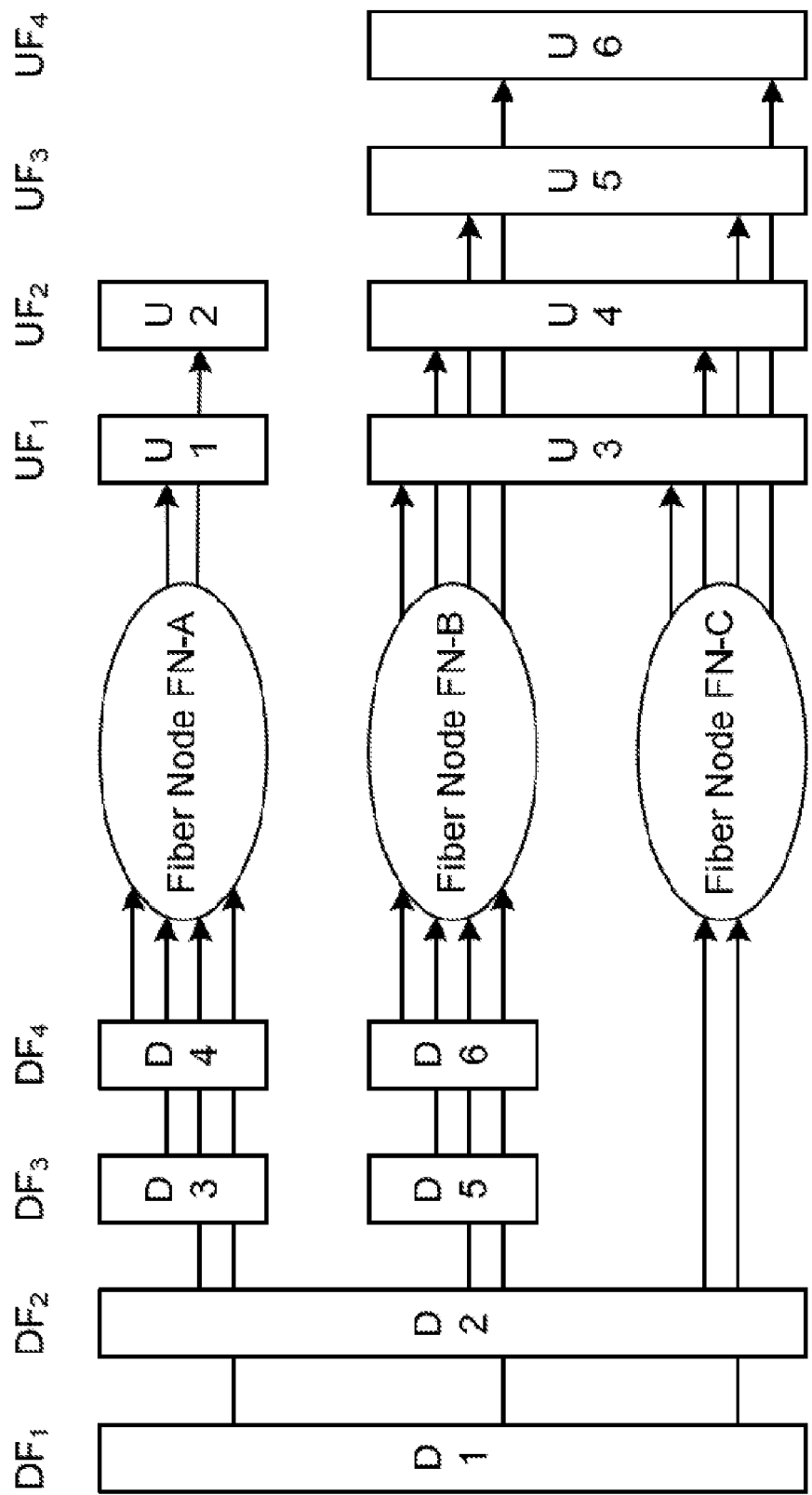
FIG. 3 illustrates a frequency/space diagram of an example DOCSIS-based network.

FIG. 3 illustrates a frequency/space diagram of another example DOCSIS-based system that depicts the reachability of downstream and upstream channels. A CMTS downstream channel is said to reach a CM when its downstream radio frequency (RF) signal can be received by the CM. A CMTS upstream channel is said to "reach" a CM if the CMTS can receive the upstream transmission by that CM. Each vertical column on the left side of FIG. 3 (denoted by the labels DF1, DF2, DF3, DF4) represents a downstream frequency, while each vertical column on the right side of FIG. 3 (denoted by the labels UF1, UF2, UF3, UF4) represents an upstream frequency. Each rectangle (D1, D2, D3, D4, D5, D6, U1, U2, U3, U4, U5, and U6) represents a channel.

Figure 4:
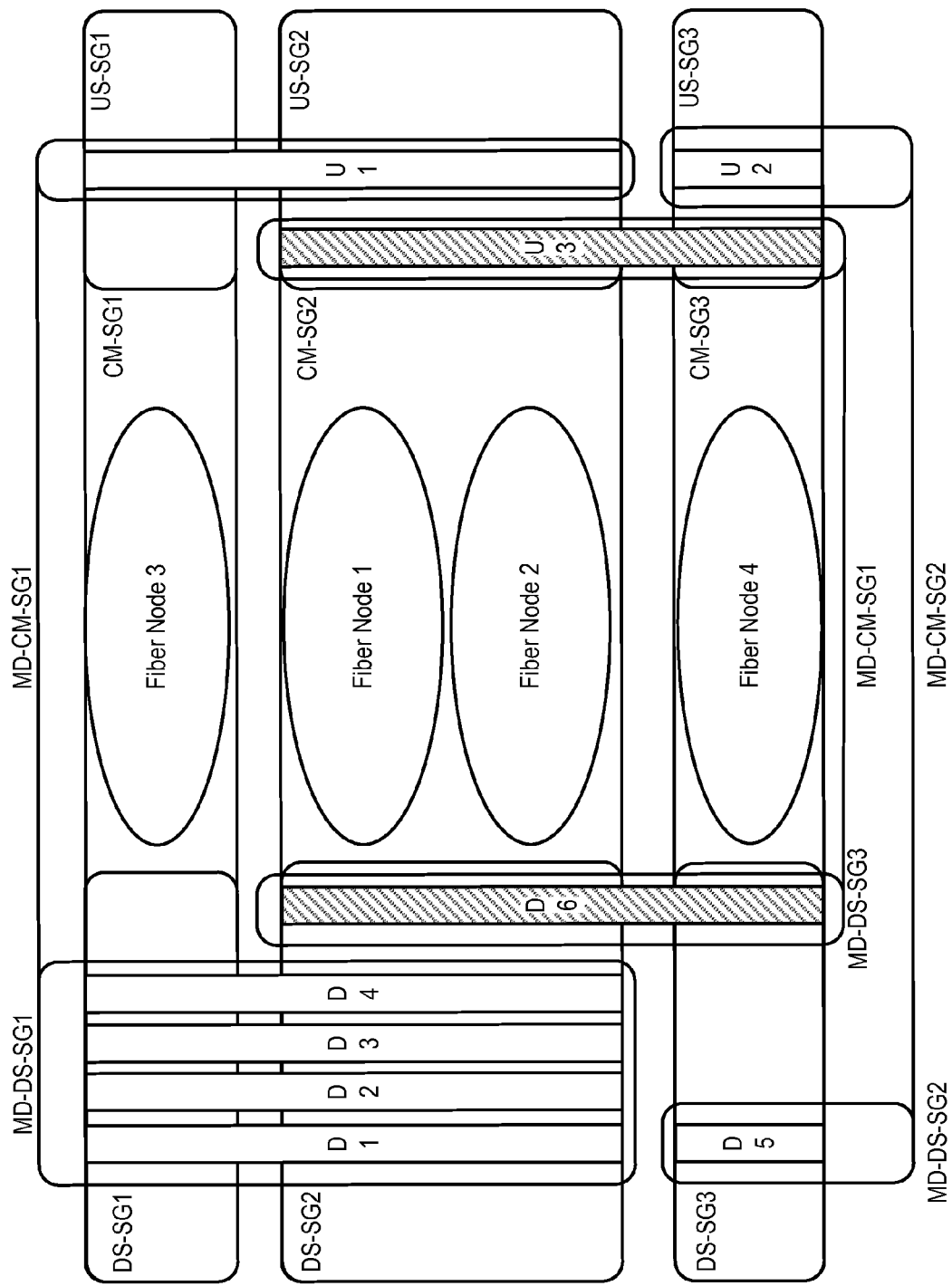
FIG. 4 illustrates a frequency/space diagram of another example DOCSIS-based network.

In the examples depicted by FIGS. 2 and 3, the channels are assumed to be configured to the same MAC domain. FIG. 4 illustrates a frequency/space diagram of an example DOCSIS system in which the upstream and downstream channels of the CMTS have been configured to different MAC domains. The example DOCSIS system of FIG. 4 includes four fiber nodes and two MAC domains. MAC domain 1 (MD1) includes the set of channels D1/D2/D3/D4/D5/U1/U2 (denoted by the solid rectangles) while MAC domain 2 (MD2) includes the set of channels D6/U3 (denoted by the rectangles with hash lines).

DOCSIS identifies a MAC domain CM service group (MD-CM-SG) as the set of downstream and upstream channels from the same MAC domain, all of which reach a single CM. In the example of FIG. 4, the DOCSIS system includes three CM-SGs: (1) CM-SG1 including the set of channels D1/D2/D3/D4/U1; (2) CM-SG2 including the set of channels D1/D2/D3/D4/D6/U1/U3; and (3) CM-SG3 including the set of channels D5/D6/U2/U3. For MD1, there are two MD-CM-SGs: (1) MD-CM-SG1 including the set of channels D1/D2/D3/D4/U1; and (2) MD-CM-SG2 including the set of channels D5/U2. For MD2, there is one MD-CM-SG, namely, MD-CM-SG1 including the set of channels D6/U3.

For load balancing purposes, DOCSIS identifies a load balancing group (LBG) as a set of upstream and downstream channels in the same CM-SG over which a CMTS performs load balancing for a set of CMs. Pursuant to DOCSIS, the CMTS creates an LBG for every MD-CM-SG of a DOCSIS system. For example, in the DOCSIS system depicted in FIG. 4, the CMTS 110 can create three LBGs corresponding to the two MD-CM-SGs for MD1 and the one MD-CM-SG for MD2. Other LBGs, for example LBGs that contain a subset of the channels in a CM-SG, can also be created. The CMTS can attempt to balance load among all of the channels of each LBG. The CMTS also can attempt to balance load between two MD-CM-SGs, for example.

Each LBG can have associated with it one or more rules that govern how a CM can be moved from one channel to another. However, DOCSIS leaves the definition of a balanced load to the CMTS vendor, and the algorithm(s) by which the CMTS attempts to achieve and maintain this balance is similarly left to the CMTS vendor. Accordingly, load balancing algorithms can be developed to be implemented by the CMTS to balance load. This disclosure is not limited to any particular load balancing decision algorithm. Any existing or future developed load balancing decision algorithm is intended to be included within the scope of this disclosure.

Existing DOCSIS systems do not permit a system operator to prioritize (e.g., assign a weight or bias, or set the level of importance of) the upstream and downstream channel loading conditions relative to each other for load balancing operations.

Figure 5:
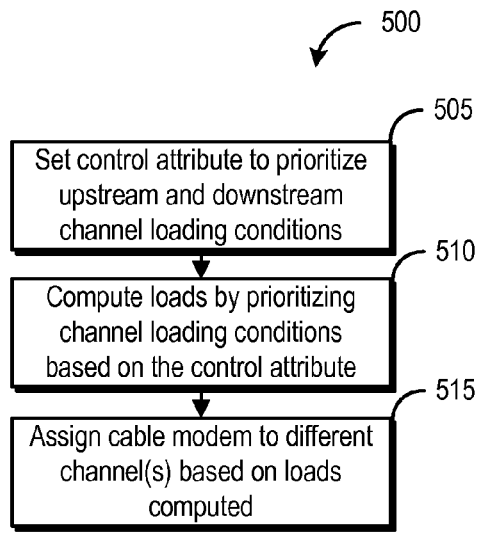
FIG. 5 illustrates an example process for load balancing.

FIG. 5 illustrates an example process 500 for load balancing by prioritizing the upstream and downstream channel loading conditions relative to each other. At stage 505, a control attribute is set. The control attribute permits a system operator to prioritize the upstream and downstream channel loading conditions relative to each other for load balancing decisions. For example, a control attribute that permits a system operator to prioritize the upstream and downstream channel loading conditions relative to each other for load balancing decisions can be included as a new object used by a new vendor implemented Management Information Base (MIB) module that can operate in parallel to a DOCSIS specified MIB module for load balancing (e.g., DOCS-LOAD-BAL3-MIB). In this way, load balancing decisions can be applied to diverse network topologies and conditions by changing the control attribute.

In some implementations, the control attribute can be set to one of a finite number of values to specify a predefined priority or weighting of the upstream and downstream channel loading conditions relative to each other for load balancing decisions.

For example, a first value of the control attribute can indicate that the upstream and downstream channel loading conditions should be used equally (i.e., the upstream and downstream channel loading conditions should have equal priority) for load balancing decisions; a second value can indicate that only the upstream channel loading conditions should be used for load balancing decisions; a third value can indicate that only the downstream channel loading conditions should be used for load balancing decisions; a fourth value can indicate that both the upstream and downstream channel loading conditions should be used for load balancing decisions, but the upstream channel loading conditions should be doubled, for example; and a fifth value can indicate that both the upstream and downstream channel loading conditions should be used for load balancing decisions, but the downstream channel loading conditions should be doubled, for example.

In the example above, a system operator may want to set the control attribute to the third value, for example, if, for example, channel bonding is performed for the upstream channels but not for the downstream channels. A system operator may want to set the control attribute to the second or fourth value, for example, if there are more downstream channels than upstream channels in the LBG, for example.

As another example, the control attribute can be set to specify the percentage of time of a specified time duration a first priority or weighting of the upstream and downstream channel loading conditions relative to each other should be used for load balancing decisions; during the remaining percentage of time duration, a second priority or weighting of the upstream and downstream channel loading conditions relative to each other can be used for load balancing decisions. For example, the control attribute can be set to specify the percentage of time only the upstream channel loading conditions should be used for load balancing decisions; during the remaining percentage of time, only the downstream channel loading conditions are used for load balancing decisions. The time duration can be specified based on a start time and a time duration. This implementation may be useful if load balancing conditions change as a function of the time of the day.

The control attribute can take many forms and this disclosure is not limited to the examples set forth above.

At stage 510, loads are computed by prioritizing the upstream and downstream channel loading conditions relative to each other based on the control attribute.

Table 1 illustrates the upstream and downstream channel utilizations (e.g., percentage of total bandwidth being used) for an example DOCSIS-based system.

TABLE 1

| MAC Domain | Channel | Utilization |
| --- | --- | --- |
| 1 | US1_1 | 20% |
| 1 | US1_2 | 10% |
| 1 | US1_3 | 30% |
| 1 | DS1_1 | 50% |
| 1 | DS1_2 | 40% |
| 1 | DS1_3 | 20% |
| 2 | US2_1 | 40% |
| 2 | US2_2 | 50% |

TABLE 1-continued

| MAC Domain | Channel | Utilization |
|---|---|---|
| 2 | DS2_1 | 10% |
| 2 | DS2_2 | 60% |
| 3 | US3_1 | 30% |
| 3 | US3_2 | 20% |
| 3 | DS3_1 | 30% |
| 3 | DS3_2 | 80% |
| 4 | US4_1 | 70% |
| 4 | US4_2 | 40% |
| 4 | DS4_1 | 10% |
| 4 | DS4_2 | 40% |
| 4 | DS4_3 | 50% |
| 4 | DS4_4 | 20% |

To apply inter-MAC domain load balancing to the DOCSIS-based system represented by Table 1 based on the implementation described in paragraph [0023] above, assume that a load balancing decision can result in a CM moving from the highest loaded MAC domain (i.e., the MAC domain having the highest utilization) to the lowest loaded MAC domain (i.e., the MAC domain having the lowest utilization). Further, assume that a MAC domain load ($L_{MD}$) is equal to the sum of the weighted average upstream channel utilization and the weighted average downstream channel utilization where the weighting is based on the control attribute. Finally, assume that the control attribute is set to the fourth value so that both the upstream and downstream channel loading conditions are used for load balancing decisions, but the upstream channel loading conditions are doubled.

Accordingly, the load for MAC Domain 1, $L_{MD1}$, can be computed as follows:

$$L_{MD1} = \frac{2(US1\_1 + US1\_2 + US1\_3)}{3} + \frac{DS1\_1 + DS1\_2 + DS1\_3}{3} = 76.7$$

Similarly, $$L_{MD2} = \frac{2(US2\_1 + US2\_2)}{2} + \frac{DS2\_1 + DS2\_2}{2} = 125$$

$$L_{MD3} = \frac{2(US3\_1 + US3\_2)}{2} + \frac{DS3\_1 + DS3\_2}{2} = 105$$

$$L_{MD4} = \frac{2(US4\_1 + US4\_2)}{2} + \frac{DS4\_1 + DS4\_2 + DS4\_3 + DS4\_4}{4} = 140$$

As shown by the calculations above, the highest loaded MAC Domain is MD4 and the lowest loaded MAC domain is MD1. Thus, a load balancing decision can result in a CM moving from MD4 to MD1. One of ordinary skill in the art would understand the process for moving a CM from one MAC domain to another.

Table 2 illustrates the utilizations for sets of downstream and upstream channels, (DS, US), in a MAC domain for another example DOCSIS-based system.

TABLE 2

| MAC Domain | DS Channel | DS Channel Utilization | US Channel | US Channel Utilization |
|---|---|---|---|---|
| 1 | DS1 | 20% | US1 | 50% |
| 1 | DS1 | 10% | US2 | 10% |
| 1 | DS2 | 30% | US3 | 20% |
| 1 | DS2 | 30% | US4 | 90% |
| 1 | DS2 | 40% | US5 | 5% |
| 1 | DS3 | 20% | US6 | 60% |
| 1 | DS4 | 50% | US7 | 40% |
| 1 | DS5 | 5% | US8 | 70% |
| 1 | DS5 | 60% | US9 | 40% |

To apply intra-MAC domain load balancing to the DOCSIS-based system represented by Table 2 based on the implementation described in paragraph [0023] above, assume that a load balancing decision can result in a CM moving from the highest loaded downstream and upstream channel pair to the lowest loaded downstream and upstream channel pair. Further, assume that a load for a downstream and upstream channel pair ($L_{DS,US}$) is equal to the weighted sum of the downstream channel utilization and the upstream channel utilization for that pair where the weighting is based on the control attribute. Finally, assume that the control attribute is set to the fifth value so that both the upstream and downstream channel loading conditions are used for load balancing decisions, but the downstream channel loading conditions are doubled.

Accordingly, the load for (DS1, US1) can be computed as follows:

$$L_{DS1,US1} = 2(20) + 50 = 90$$

Similarly, $$L_{DS1,US2} = 2(10) + 10 = 30$$

$$L_{DS2,US3} = 2(30) + 20 = 80$$

$$L_{DS2,US4} = 2(30) + 90 = 150$$

$$L_{DS2,US5} = 2(40) + 5 = 85$$

$$L_{DS3,US6} = 2(20) + 60 = 100$$

$$L_{DS4,US7} = 2(50) + 40 = 140$$

$$L_{DS5,US8} = 2(5) + 70 = 80$$

$$L_{DS5,US9} = 2(60) + 40 = 160$$

As shown by the calculations above, the highest loaded downstream and upstream channel set is (DS5, US9) and the lowest loaded downstream and upstream channel pair is (DS1, US2). Thus, a load balancing decision can result in a CM moving from (DS5, US9) to (DS1, US2). One of ordinary skill in the art would understand the process of moving a CM from one set of downstream and upstream channels to another.

Accordingly, at stage 515, at least one cable modem is assigned to at least one different channel based on loads computed at stage 510.

This disclosure is not limited to any particular load balancing decision algorithm or load metric. In the above example, a load balancing decision resulting in a CM moving from the highest to the lowest loaded MAC Domain or channel pair was described. Further, in the above examples, utilization was used to measure load. However, any existing or future developed load balancing decision algorithm or metric can be used. For example, load can be measured based on the number of CMs.

Still further, the present disclosure is not limited to DOCSIS systems and can be applied to other communication systems including wired or wireless systems. For example, networks that use shared resources, such as radio frequency networks, often use load balancing to move devices from one communications channel to another based upon channel usage.

Figure 6:
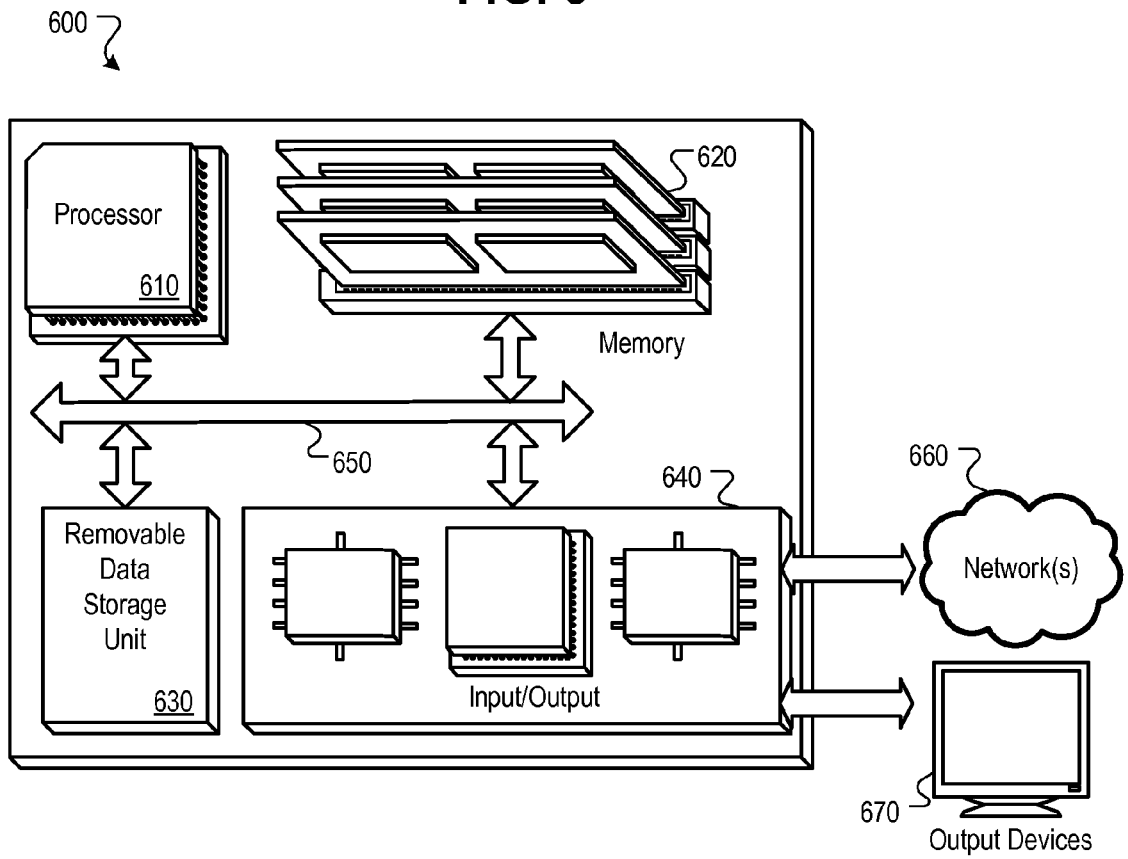
FIG. 6 illustrates an example broadband communications device operable to perform the example processes of FIG. 5.

FIG. 6 illustrates an example CMTS 110 operable to perform the example process 500 of FIG. 5. The CMTS 110 can include a processor 610, a memory 620, a removable data storage unit 630, and an input/output device 640. Each of the components 610, 620, 630, and 640 can, for example, be interconnected using a system bus 650. The processor 610 is capable of processing instructions for execution within the CMTS 110. For example, the processor 610 can be capable of processing instructions for executing the process 500 of FIG. 5 in the CMTS 110. In some implementations, the processor 610 is a single-threaded processor. In other implementations, the processor 610 is a multi-threaded processor. The processor 610 is capable of processing instructions stored in the memory 620 or on the storage device 630.

The memory 620 stores information within the CMTS 110. In some implementations, the memory 620 is a computer-readable medium. In other implementations, the memory 620 is a volatile memory unit. In still other implementations, the memory 620 is a non-volatile memory unit.

Implementations of the device of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

The processes and logic flows described in this specification can be performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, implementations of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter described in this specification have been described. Other implementations are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

The invention claimed is:

1. A method for balancing a network load, the method comprising:
    computing at least two loads by prioritizing upstream and downstream channel loading conditions relative to each other based on a control attribute, the control attribute comprising a relative level of importance of upstream loading conditions and downstream loading conditions; and
    assigning at least one cable modem to at least one different channel based on the computing step, thereby providing a configurable weighting between downstream and upstream channels for making load balancing decisions and taking into consideration the relative level of importance of upstream and downstream loading conditions.

2. The method of claim 1 wherein the control attribute can take on one of a finite number of values corresponding to a predefined weighting of the upstream and downstream channel loading conditions relative to each other.

3. The method of claim 1 wherein the control attribute can indicate at least one time to apply a weighting to the upstream and downstream channel loading conditions.

4. The method of claim 1 wherein the at least one different channel is a different upstream channel.

5. The method of claim 1 wherein the at least one different channel is a different downstream channel.

6. The method of claim 1 wherein the at least one different channel is a set of channels.

7. A non-transitory computer readable medium having instructions for causing a computer to execute a method for balancing a network load, the method comprising:
    computing at least two loads by prioritizing upstream and downstream channel loading conditions relative to each other based on a control attribute, the control attribute comprising a relative level of importance of upstream loading conditions and downstream loading conditions; and assigning at least one cable modem to at least one different channel based on the computing step, thereby providing a configurable weighting between downstream and upstream channels for making load balancing decisions and taking into consideration the relative level of importance of upstream and downstream loading conditions.

8. The computer readable medium of claim 7 wherein the control attribute can take on one of a finite number of values corresponding to a predefined weighting of the upstream and downstream channel loading conditions relative to each other.

9. The computer readable medium of claim 7 wherein the control attribute can indicate at least one time to apply a weighting to the upstream and downstream channel loading conditions.

10. The computer readable medium of claim 7 wherein the at least one different channel is a different upstream channel.

11. The computer readable medium of claim 7 wherein the at least one different channel is a different downstream channel.

12. The computer readable medium of claim 7 wherein the at least one different channel is a set of channels.

13. A system for balancing a network load, the system comprising:
  means for computing at least two loads by prioritizing upstream and downstream channel loading conditions relative to each other based on a control attribute, the control attribute comprising a relative level of importance of upstream loading conditions and downstream loading conditions; and
  a cable modem termination system operable to assign at least one cable modem to at least one different channel based on results from the means for computing at least two loads, thereby providing a configurable weighting between downstream and upstream channels for making load balancing decisions and taking into consideration the relative level of importance of upstream and downstream loading conditions.

14. A method for balancing a load of a communication system, the method comprising:
  computing at least two loads by prioritizing upstream and downstream channel loading conditions relative to each other based on a control attribute, the control attribute comprising a relative level of importance of upstream loading conditions and downstream loading conditions; and
  reconfiguring the load of at least one channel based on the computing step thereby providing a configurable weighting between downstream channels and upstream channels for making load balancing decisions taking into consideration the relative level of importance of upstream and downstream loading conditions.

* * * * *